US009955628B2

(12) United States Patent
Gonzalez-Mohino

(10) Patent No.: US 9,955,628 B2
(45) Date of Patent: May 1, 2018

(54) REVERSIBLE DRIVE SYSTEM FOR AN AGRICULTURAL MACHINE

(71) Applicant: Deere & Company, Moline, IL (US)

(72) Inventor: Pedro Gonzalez-Mohino, Boadilla Del Monte (ES)

(73) Assignee: Deere & Company, Moline, IL (US)

( * ) Notice: Subject to any disclaimer, the term of this patent is extended or adjusted under 35 U.S.C. 154(b) by 130 days.

(21) Appl. No.: 14/865,530

(22) Filed: Sep. 25, 2015

(65) Prior Publication Data
US 2017/0086365 A1  Mar. 30, 2017

(51) Int. Cl.
 A01D 41/14   (2006.01)
 A01D 41/127  (2006.01)
 A01D 69/00   (2006.01)
 A01D 69/02   (2006.01)
 A01D 69/06   (2006.01)
 A01D 34/00   (2006.01)
 B62D 63/02   (2006.01)

(52) U.S. Cl.
 CPC ......... *A01D 41/142* (2013.01); *A01D 34/003* (2013.01); *A01D 34/006* (2013.01); *A01D 41/1274* (2013.01); *A01D 69/00* (2013.01); *A01D 69/025* (2013.01); *A01D 69/06* (2013.01); *B62D 63/02* (2013.01)

(58) Field of Classification Search
 USPC .................................................... 460/2, 3, 6
 See application file for complete search history.

(56) References Cited

U.S. PATENT DOCUMENTS 4,138,837 A * 2/1979 Love ............... A01D 41/142
                                              475/210
4,274,426 A * 6/1981 Williams ............ A01F 7/062
                                              460/67
(Continued)

FOREIGN PATENT DOCUMENTS

DE   102011017618 A1   10/2012
EP       1340419 A2    9/2003
(Continued)

OTHER PUBLICATIONS

EP Application No. 16184266.1 Extended Search Report dated Jan. 24, 2017, 10 pages.

*Primary Examiner* — Alicia Torres
(74) *Attorney, Agent, or Firm* — Christopher J. Volkmann; Kelly, Holt & Christenson, PLLC

(57) ABSTRACT

An example agricultural harvesting machine includes a header and a feed system configured to feed material from the header through a threshing section along a conveyance path. The feed system includes a conveyance mechanism that conveys the material from the header to a rotating feed mechanism. The feed system also includes a drive system configured to rotationally drive the feed mechanism during a first state to convey the material along the conveyance path, and to reverse rotation of the feed mechanism during a second state. In one example, a drive system includes first and second drive mechanisms and a coupling mechanism configured to selectively couple one of the first or second drive mechanisms to an output mechanism, such as, but not limited to, a rotating feed mechanism in an agricultural harvesting machine.

19 Claims, 10 Drawing Sheets

(56) References Cited

U.S. PATENT DOCUMENTS

| | | | | |
|---|---|---|---|---|
| 4,430,847 | A * | 2/1984 | Tourdot | A01D 41/1274 |
| | | | | 474/1 |
| 4,512,139 | A | 4/1985 | Musser et al. | |
| 4,663,919 | A | 5/1987 | Stroh et al. | |
| 5,733,192 | A * | 3/1998 | Jones | A01F 12/22 |
| | | | | 460/106 |
| 5,873,227 | A * | 2/1999 | Arner | A01F 12/56 |
| | | | | 56/10.2 G |
| 6,381,932 | B1 * | 5/2002 | Clauss | A01D 57/04 |
| | | | | 460/2 |
| 6,843,044 | B2 * | 1/2005 | Clauss | A01D 41/127 |
| | | | | 56/10.3 |
| 7,427,231 | B2 * | 9/2008 | Brome | A01D 41/1276 |
| | | | | 460/1 |
| 2003/0159416 | A1 * | 8/2003 | Pierce | A01D 41/142 |
| | | | | 56/10.2 J |
| 2005/0181900 | A1 * | 8/2005 | Jonckheere | A01D 69/00 |
| | | | | 474/117 |

FOREIGN PATENT DOCUMENTS

| | | |
|---|---|---|
| EP | 1609351 A1 | 12/2005 |
| WO | 2010003966 A1 | 1/2010 |

\* cited by examiner

REVERSIBLE DRIVE SYSTEM FOR AN AGRICULTURAL MACHINE

FIELD OF THE DESCRIPTION

The present disclosure generally relates to machine drive systems. More specifically, but not by limitation, the present disclosure relates to a drive system for an agricultural harvesting machine or combine.

BACKGROUND

There are many different types of machines that have a drive system for operating a variety of sub-systems or other components. In the context of agriculture, for example, harvesters, seeders and planters, tillage equipment, and sprayers can have one or more drive systems for controlling the overall movement of the machine, as well as components on the machine.

In an example agricultural harvesting machine or combine, a variety of implements can be driven by a drive system that is controlled by one or more control systems on the machine. A combine can be used to harvest any of a variety of crops, such as wheat, oats, corn, soybeans, sunflowers, and canola. The machine includes sub-systems or other components for traversing the machine across the field, as well as for crop reaping, threshing, and winnowing. Different types of implement heads, or headers, can be utilized depending on the type of crop being harvested.

The discussion above is merely provided for general background information and is not intended to be used as an aid in determining the scope of the claimed subject matter.

SUMMARY

An agricultural harvesting machine is described. In one example, the machine comprises a header, a feed system configured to feed material from the header through a threshing section along a conveyance path, the feed system including a conveyance mechanism that conveys the material from the header to a rotating feed mechanism, and a drive system configured to rotationally drive the feed mechanism during a first state to convey the material along the conveyance path, and to reverse rotation of the feed mechanism during a second state.

In one example, a drive system comprises first and second drive mechanisms, and a coupling mechanism configured to selectively couple one of the first or second drive mechanisms to an output mechanism, such as, but not limited to, a rotating feed mechanism in an agricultural harvesting machine.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

The present disclosure generally relates to machine drive systems and control thereof. There are many different types of machines that utilize drives systems for operating a variety of sub-systems or other components. Some examples include, but are not limited to, automotive vehicles, aerial vehicles, nautical vehicles, construction equipment, agricultural equipment, and the like. The drive systems operate to impart motion (e.g., linear motion, rotational motion, etc.) in the sub-systems or other components. In the context of an agricultural harvesting machine or combine, a feed subsystem utilizes a conveyance assembly, a rotating feed mechanism (e.g., a feed accelerator and/or a threshing cylinder or drum) to feed agricultural material (e.g., a harvested crop) through the machine.

As discussed in further detail below, during normal operation of a combine the feed system components are driven in a first or normal direction to convey the material through combine. However, in some situations the feed system component(s) can become plugged, jammed, or otherwise stuck, for example as a result of the material flow increasing beyond an operational threshold or limit. Often, this requires the operator to stop the machine and manually rectify the plugged feed components, such as by removing a housing of the feed system to access the feed components.

Before describing an agricultural harvesting machine in more detail, one example of a machine drive system 100 will first be described with respect to FIG. 1. It is noted that, while examples are described herein in the context of a combine, the example drive systems and related components and methods can be utilized in other types of machines as well.

Figure 1:
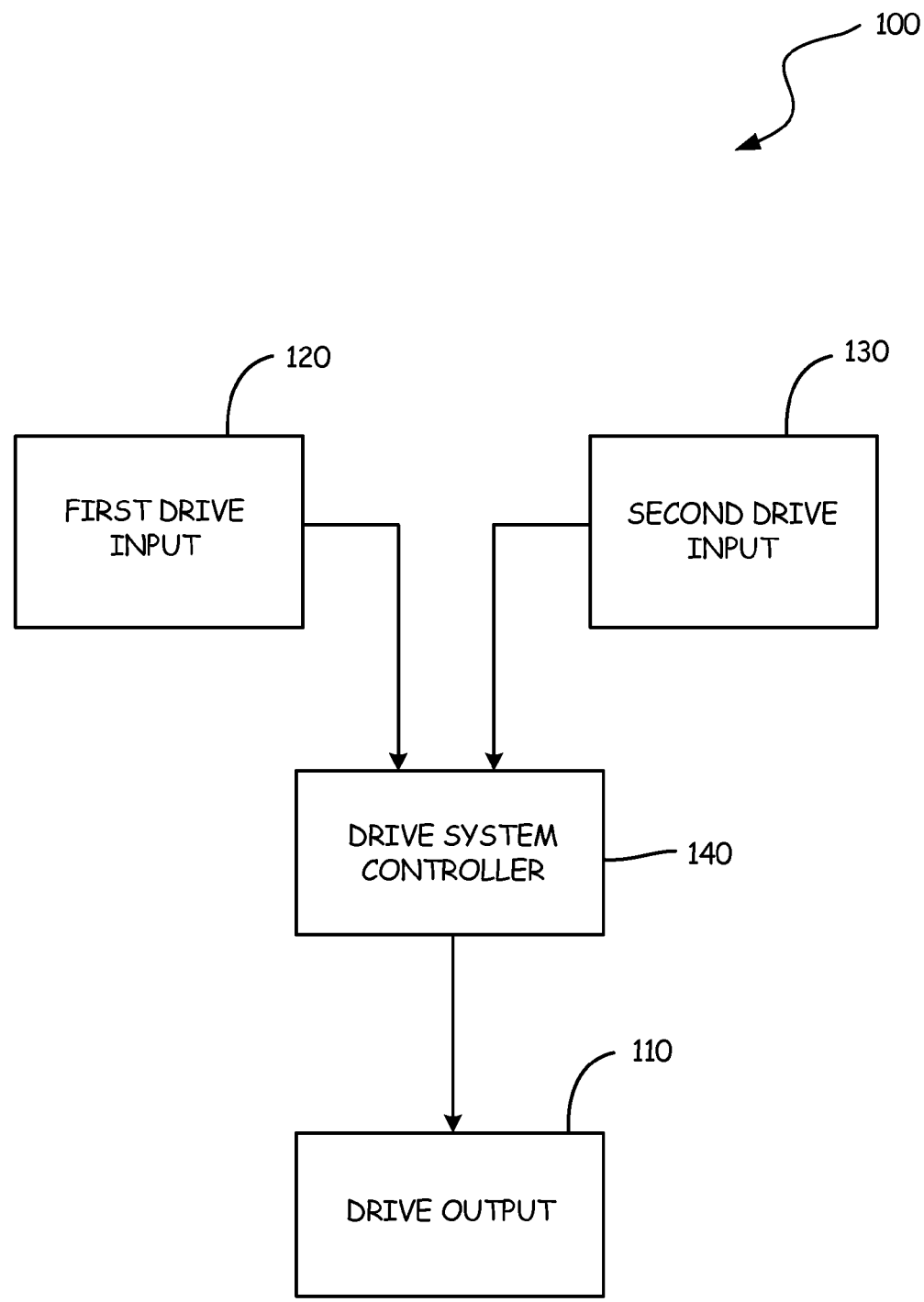
FIG. 1 is a simplified schematic diagram of a drive system, in one example.

FIG. 1 is a simplified schematic diagram of drive system 100, which can be utilized in any of a variety of vehicles or other machines. One example is a combine. Drive system 100 is configured to produce a drive output 110 that imparts motion (e.g., linear motion, rotational motion, etc.) in a sub-systems or other component of the machine. Drive system 100 comprises a plurality of drive inputs, illustratively a first drive input 120 and a second drive input 130. The first and second drive inputs 120 and 130 comprise, in one example, inputs from a same drive mechanism (e.g., two drive belts or chains from a same motor). In another example, inputs 120 and 130 comprise inputs from different, independently operably drive mechanisms. For instance, the mechanisms can comprise separate motors. In one particular example, the first drive mechanism comprises an internal combustion engine and the second drive mechanism comprises an electric motor.

A drive system controller 140 is configured to control the drive output 110 based on a control signal, which can be generated based on operator input, automatically, or semi-automatically. In one example, the control signal is utilized to selectively couple one of the drive inputs 120 and 130 to the drive output 110. As discussed in further detail below, in an example combine implementation, drive output 110 comprises a rotating feed mechanism (e.g., a feed accelerator, a threshing drum, etc.), and drive system controller 140 selectively couples one of input 120 or 130 to drive the feed mechanism.

Figure 2:
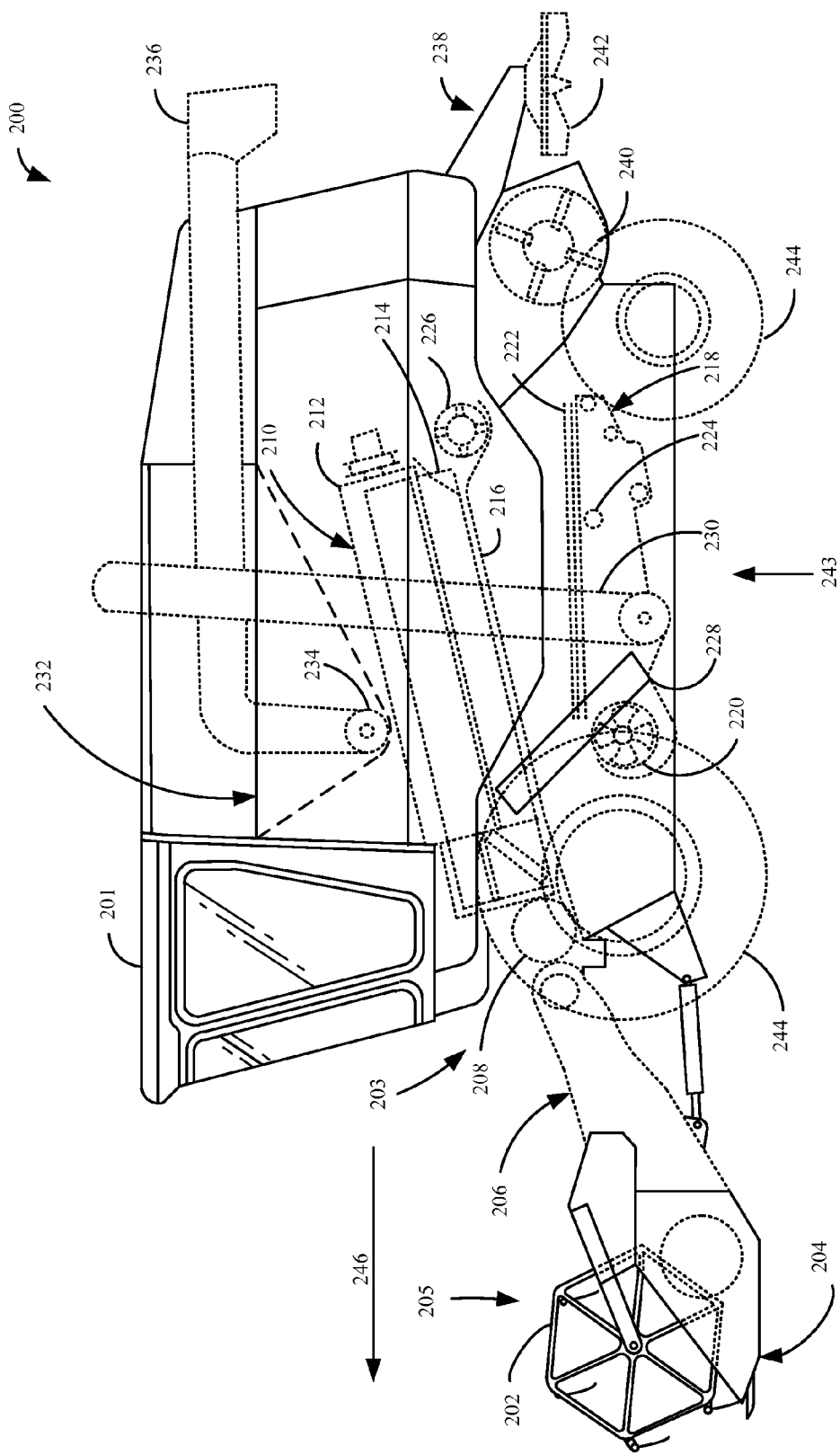
FIG. 2 is a partial schematic illustration of an agricultural harvesting machine or combine, in one example.

FIG. 2 is a partial schematic illustration of an agricultural harvesting machine or combine 200 that includes a drive system, in one example. It can be seen in FIG. 2 that combine 200 illustratively includes an operator compartment 201, and a front end subsystem including a set of front end equipment that can include header 202 and a cutter generally indicated at 204. Header 202 and cutter 204 are configured based on the type of crop to be harvested.

Combine 200 also includes a material handling or feed subsystem 203 configured to convey or feed the cut crop into and through at least a portion of combine 200. Feed subsystem 203 includes a conveyance assembly, such as feederhouse 206, that conveys the crop from the front end equipment into combine 200. Feed subsystem 203 also includes a rotating feed mechanism that receives the crop from feederhouse 206. In the illustrated example, the rotating feed mechanism comprises a feed accelerator 208 configure to accelerate the crop feed toward or into a subsequent threshing stage (e.g., a rotating threshing drum or cylinder). However, it is noted that in another example in which a feed accelerator is not utilized, the threshing stage can be disposed to receive the crop from feederhouse 206. In one example, the axis of the threshing drum is oriented perpendicular to the crop flow from feederhouse 206. In another example, the axis of the threshing drum is substantially aligned with the crop flow.

In the example of FIG. 2, a thresher 210 illustratively includes a threshing rotor 212 and a set of concaves 214. Further, combine 200 can include a separator 216 that includes a separator rotor. Combine 200 can include a cleaning subsystem (or cleaning shoe) 218 that, itself, can include a cleaning fan 220, chaffer 222 and sieve 224. Material handling or feed subsystem 203 can include (in addition to a feederhouse 206 and feed accelerator 208) discharge beater 226, tailings elevator 228, clean grain elevator 230 (that moves clean grain into clean grain tank 232) as well as unloading auger 234 and spout 236. Combine 200 can further include a residue subsystem 238 that can include chopper 240 and spreader 242. Combine 200 can also have a propulsion subsystem 243 that includes ground engaging wheels 244 or tracks, etc. that are driven by a drive train. It will be noted that combine 200 may also have more than one of any of the subsystems mentioned above (such as left and right cleaning shoes, separators, etc.).

In operation, and by way of overview, combine 200 illustratively moves through a field in the direction indicated by arrow 246. As it moves, header 202 engages the crop to be harvested and gathers it toward cutter 204. After it is cut, it is moved by a conveyor in feederhouse 206 toward feed accelerator 208, which accelerates the crop into thresher 210. The crop is threshed by rotor 212 rotating the crop against concave 214. The threshed crop is moved by a separator rotor in separator 216 where some of the residue is moved by discharge beater 226 toward the residue subsystem 238. It can be chopped by residue chopper 240 and spread on the field by spreader 242. In other implementations, the residue is simply dropped in a windrow, instead of being chopped and spread.

Grain falls to cleaning shoe (or cleaning subsystem) 218. Chaffer 222 separates some of the larger material from the grain, and sieve 224 separates some of the finer material from the clean grain. Clean grain falls to an auger in clean grain elevator 230, which moves the clean grain upward and deposits it in clean grain tank 232. Residue can be removed from the cleaning shoe 218 by airflow generated by cleaning fan 220. That residue can also be moved rearwardly in combine 200 toward the residue subsystem 238.

Tailings can be moved by tailings elevator 228 back to thresher 210 where they can be re-threshed. Alternatively, the tailings can also be passed to a separate re-threshing mechanism (also using a tailings elevator or another transport mechanism) where they can be re-threshed as well.

Figure 3:
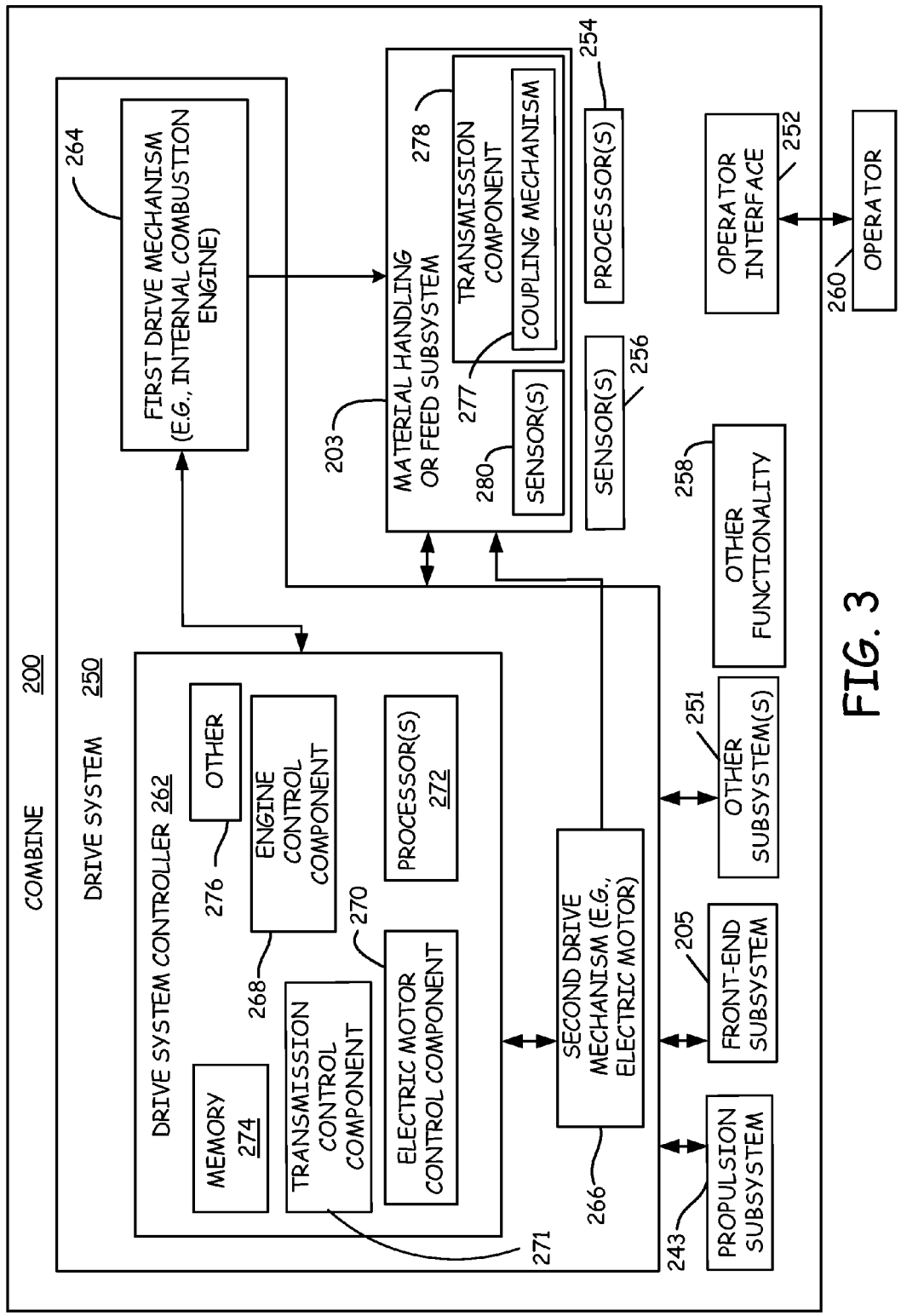
FIG. 3 is a simplified block diagram showing some components of a combine, in one example.

FIG. 3 is a simplified block diagram showing some components of combine 200, in one example. Combine 200 has a drive system 250 configured to drive one or more subsystems including, but not limited to, feed subsystem 203, front-end subsystem 205, propulsion subsystem 243 and/or other subsystems 251. Combine 200 also includes an operator interface 252, one or more processors 254, one or more sensors 256, and can include a wide variety of other functionality 258.

In one example, operator interface 252 includes operator input mechanisms and output mechanisms. The output mechanisms can be mechanisms that can convey information to an operator 260, such as visual display devices, audio devices, haptic feedback devices, etc. The operator input mechanisms can include a wide variety of different mechanisms that can be actuated by operator 260 to control and manipulate various systems and subsystems of combine 200. The operator input mechanisms, for instance, can include levers, steering wheels, pedals, joysticks, buttons, keypads, user input mechanisms on user interface displays, among a wide variety of other input mechanisms.

Drive system 250 includes a drive system controller 262 configured to control at least one drive mechanism that drive the subsystem(s). For example, as shown in FIG. 3 controller 262 is configured to control operation of one or more components in feed subsystem 203, such as a rotating feed mechanism (e.g., feed accelerator 208 and/or a threshing drum of thresher 210). In one example, drive system 250 operates to rotate the feed mechanism in a first direction during the normal operation of combine 200, described above. As also mentioned above, in some situations the feed mechanism can become plugged. As mentioned in further detail below, drive system 250 is also configured to drive the rotating feed mechanism in a second, opposite direction to rectify the plugging condition.

In one example, to reverse the direction of the feed mechanism, drive system 250 can utilize a transmission that couples a drive mechanism, such as an internal combustion engine, to the feed mechanism. The transmission includes reversing gears to change a direction of rotation.

In the illustrated example, drive system 250 includes a first drive mechanism 264 and a second drive mechanism 266. Drive mechanism 264 illustratively comprises an internal combustion engine (or other type of motor) and drive mechanism 266 comprises an electric motor (or other type of motor). A first (e.g., engine) control component 268 is configured to control operation (e.g., a speed and/or direction) of drive mechanism 264 and a second (e.g., electric motor) control component 270 is configured to control operation (e.g., a speed and/or a direction) of drive mechanism 266. Controller 262 also includes a transmission control component 271 configured to control a transmission component 277. In one example, transmission control component 271 comprise component(s) to actuate transmission component 277 hydraulically, pneumatically, and/or electronically. Controller 262 can also include one or more processor(s) 272, a data store 274, and can include other components 276 as well.

Transmission component 277 is configured to transmit power from the drive system 250 to feed subsystem 203. As illustrated in FIG. 3, transmission component 277 comprises a coupling mechanism 278 configured to selectively couple one of drive mechanisms 264 and 266 to subsystem 203. Examples of coupling mechanism 278 are discussed in further detail below. Briefly, however, coupling mechanism 278 can including any suitable mechanism(s), including, but not limited to, mechanical linking component(s) that operably couples the selected drive mechanism 264 or 266 to subsystem 203. While transmission component 277 is illustrated as part of subsystem 203, it is noted that transmission component 277 can be employed outside of subsystem 203. Further, transmission component 277 can be utilized to selectively couple the drive mechanisms to other subsystems as well.

In one example, controller 262 operates to control the manner in which subsystem 203 is driven by drive system 250, for example based on an operating state of subsystem 203 (e.g., whether a feed mechanism is plugged, etc.). For instance, controller 262 operates to selectively couple (i.e., using coupling mechanism 278) first drive mechanism 264 to subsystem 203 to drive the rotating feed mechanism (e.g., feed accelerator and/or threshing drum) in a first direction, thereby conveying the crop material rearwardly through the combine 200 during normal operation. Controller 262 operates to selectively couple (using coupling mechanism 278) second drive mechanism 266 to subsystem 203 to drive the rotating feed mechanism in a second, opposite direction during a plugging event. In this manner, the second mechanism 266 (e.g., an electric motor) is used to resolve detected malfunctions (e.g., plugging, etc.) in subsystem 203. Subsystem 203 can include one or more sensors 280 to detect the malfunction (e.g., a plugged feed accelerator and/or threshing drum). A signal from sensor(s) 280 is provided to controller 262 and, using processor(s) 272, controller 262 selectively controls coupling mechanism 278 and drive mechanism 266. The signal can be indicative of, for example, a rotational speed and/or torque applied to the feed mechanism, a flow rate through subsystem 203. An indication of the detected malfunction can be provided to operator 260 through interface 252, upon which operator 260 provides an input to controller 262 to initiate a rectification process. Alternatively, or in addition, the rectification process can be initiated by controller 262 automatically in response to the signals from sensor(s) 280.

Figure 4A:
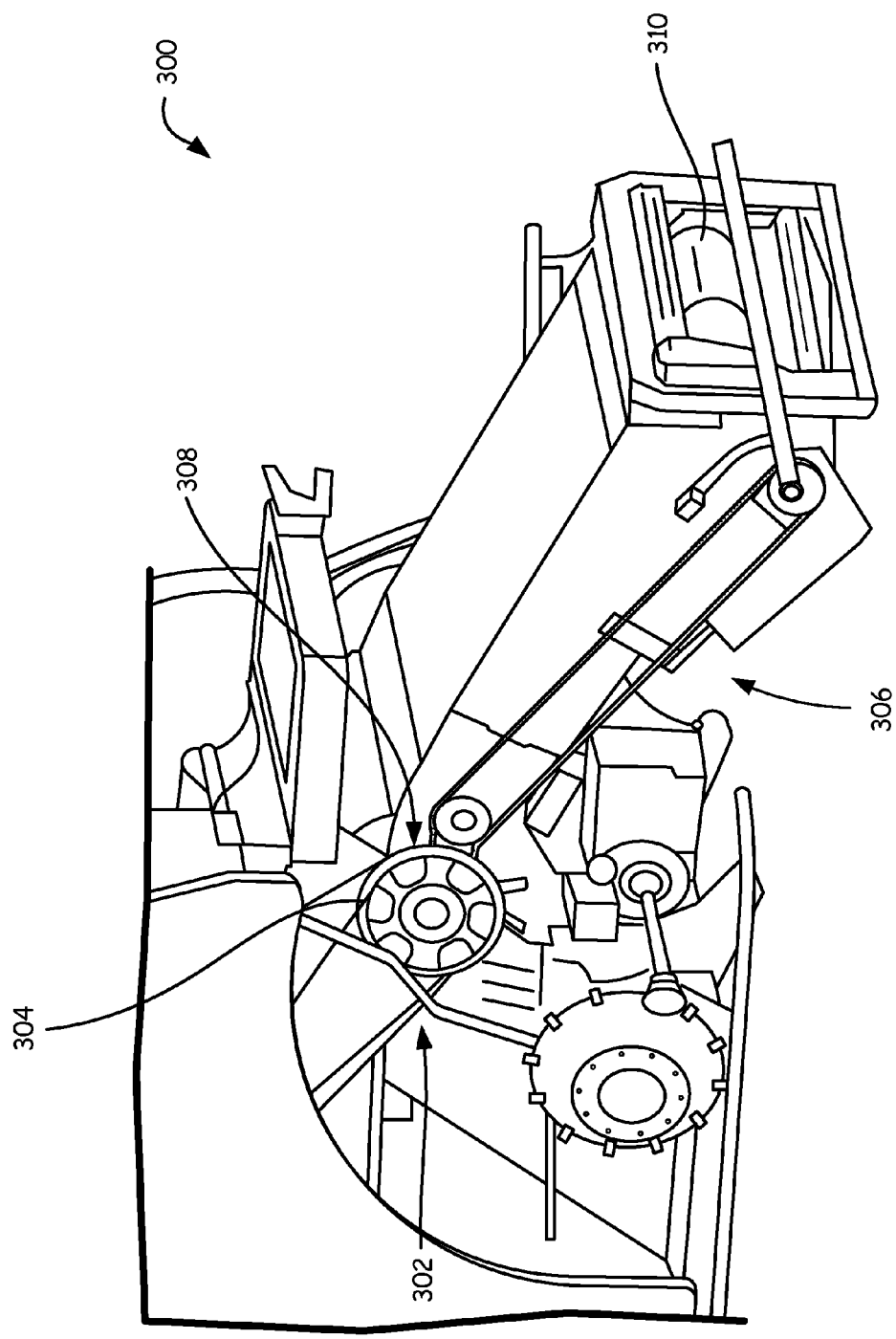
FIGS. 4A and 4B illustrate one example of a feed subsystem that is driven by a drive system.
Figure 4B:
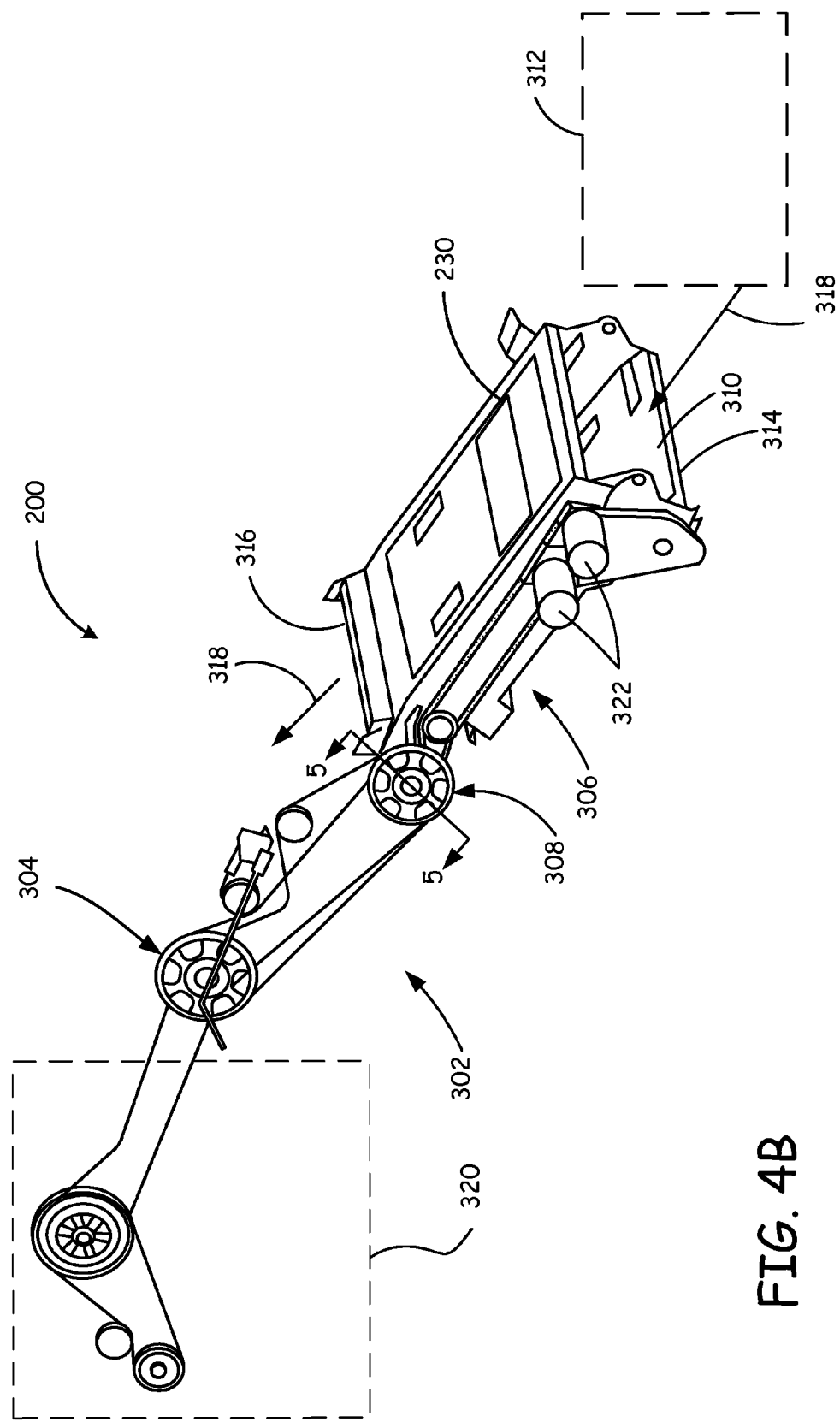

FIGS. 4A and 4B (collectively referred to as FIG. 4) illustrate one example of a feed subsystem 300 that is driven by a drive system 302. In each of FIGS. 4A and 4B, some components of feed subsystem 300 have been omitted for illustration purposes.

One example of drive system 302 is drive system 250 illustrated in FIG. 3. Drive system 302 comprises a first drive mechanism 304 and a second drive mechanism 306, that are each configured to drive feed subsystem 300 using a transmission component 308 (e.g., coupling mechanism 278 in FIG. 3). In the illustrated example, transmission component 308 is configured to selectively couple one of drive mechanisms 304 and 306 to drive a rotating feed component (not shown in FIG. 4) of subsystem 300, such as a feed accelerator and/or threshing drum.

Feed subsystem 300 includes a crop material conveyance mechanism 310 configured to convey a reaped crop from a header (generally represented by box 312) at a first end 314 of conveyance mechanism 310 to the rotating feed component at a second end 316. Accordingly, the rotating feed component is located downstream of the crop material conveyance mechanism 310 which conveys the crop material path generally represented by arrow 318. In one example, mechanism 310 comprises a feederhouse having a conveyor belt or other type of conveyance mechanism.

In one example, first drive mechanism 304 comprises a primary drive mechanism for the machine, such as an internal combustion engine (generally represented in FIG. 4B by dash box 320). Second drive mechanism 306 comprises a separate motor from mechanism 304. For example, mechanism 306 comprises one or more electric motors 322.

Each of drive mechanisms 304 and 306 comprises one or more linkage components, such as pulley(s), sprocket(s), belt(s), chain(s), and/or other component(s). In the illustrated example, mechanism 304 comprises a belt and pulley system that couples engine 320 to transmission component 308, and mechanism 306 comprises a chain and sprocket system that couples motor(s) 322 to transmission 308.

Transmission component 308 comprises any suitable mechanism to selectively transmit power from drive mechanisms 304 and 306 to the feed mechanism of subsystem 300, or other mechanism. For example, transmission 308 can include a gear box or other gear component.

Figure 5A:
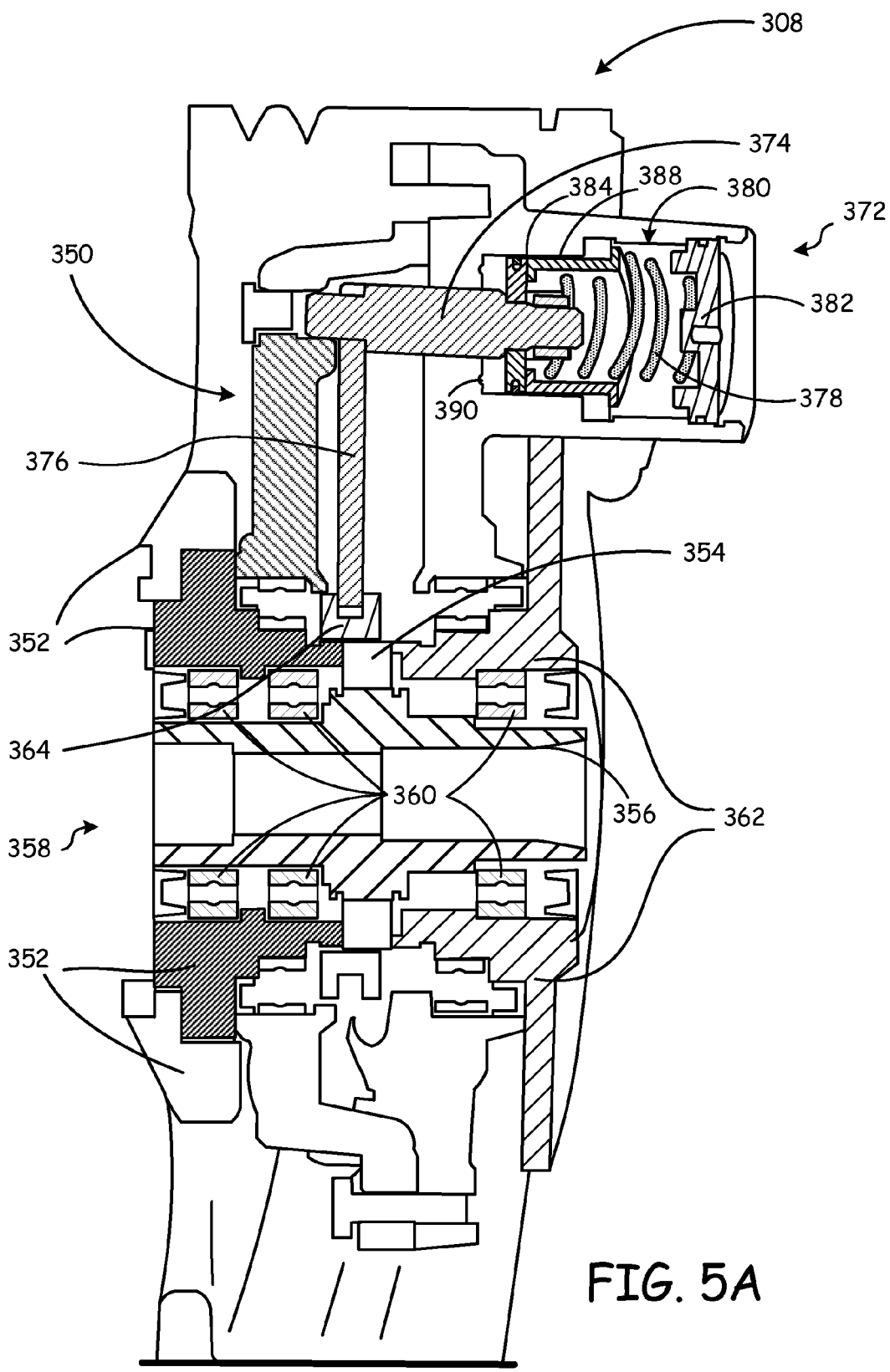
FIGS. 5A, 5B, and 5C illustrate one example of a transmission for driving a machine subsystem.
Figure 5B:
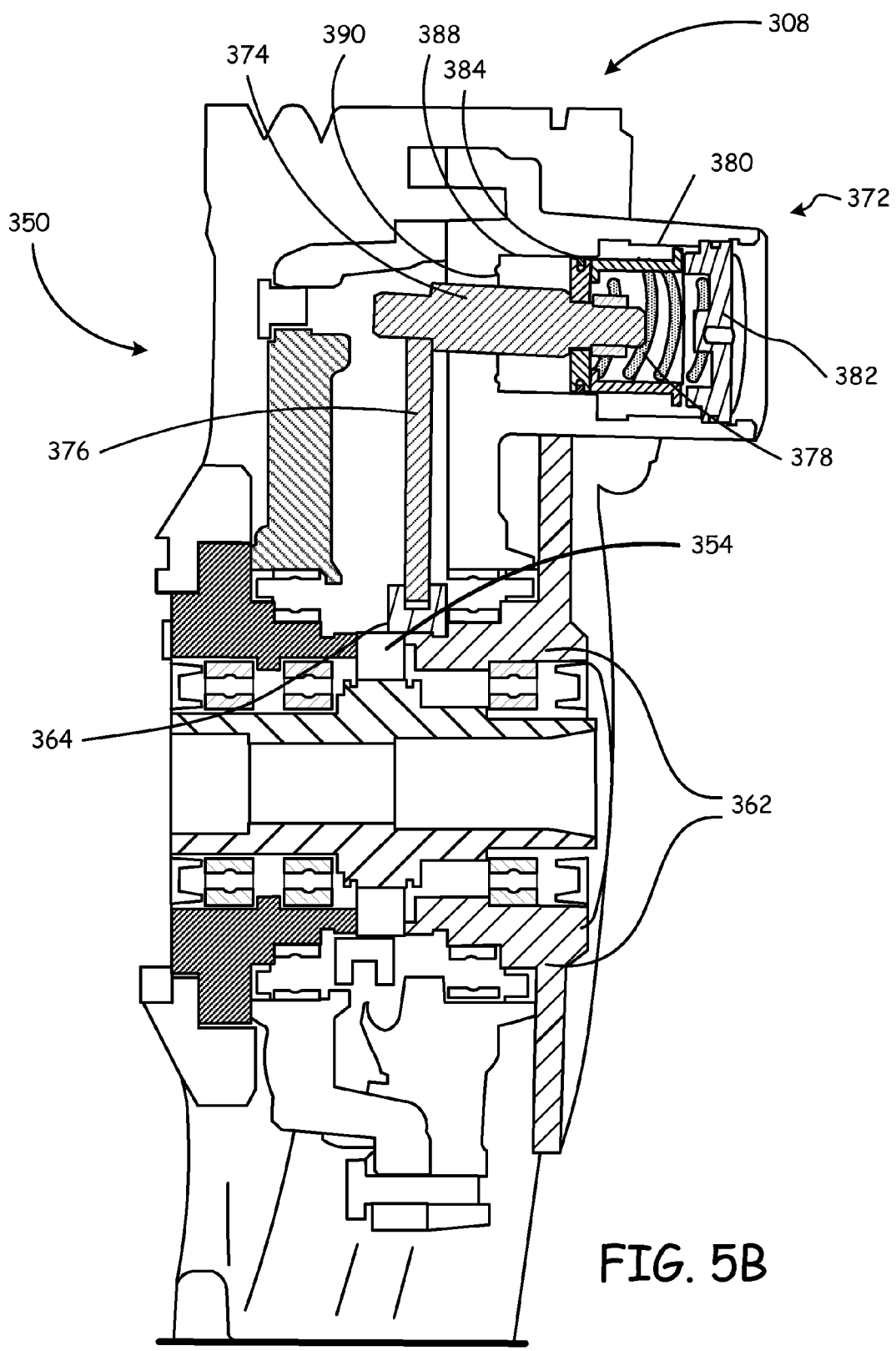
Figure 5C:
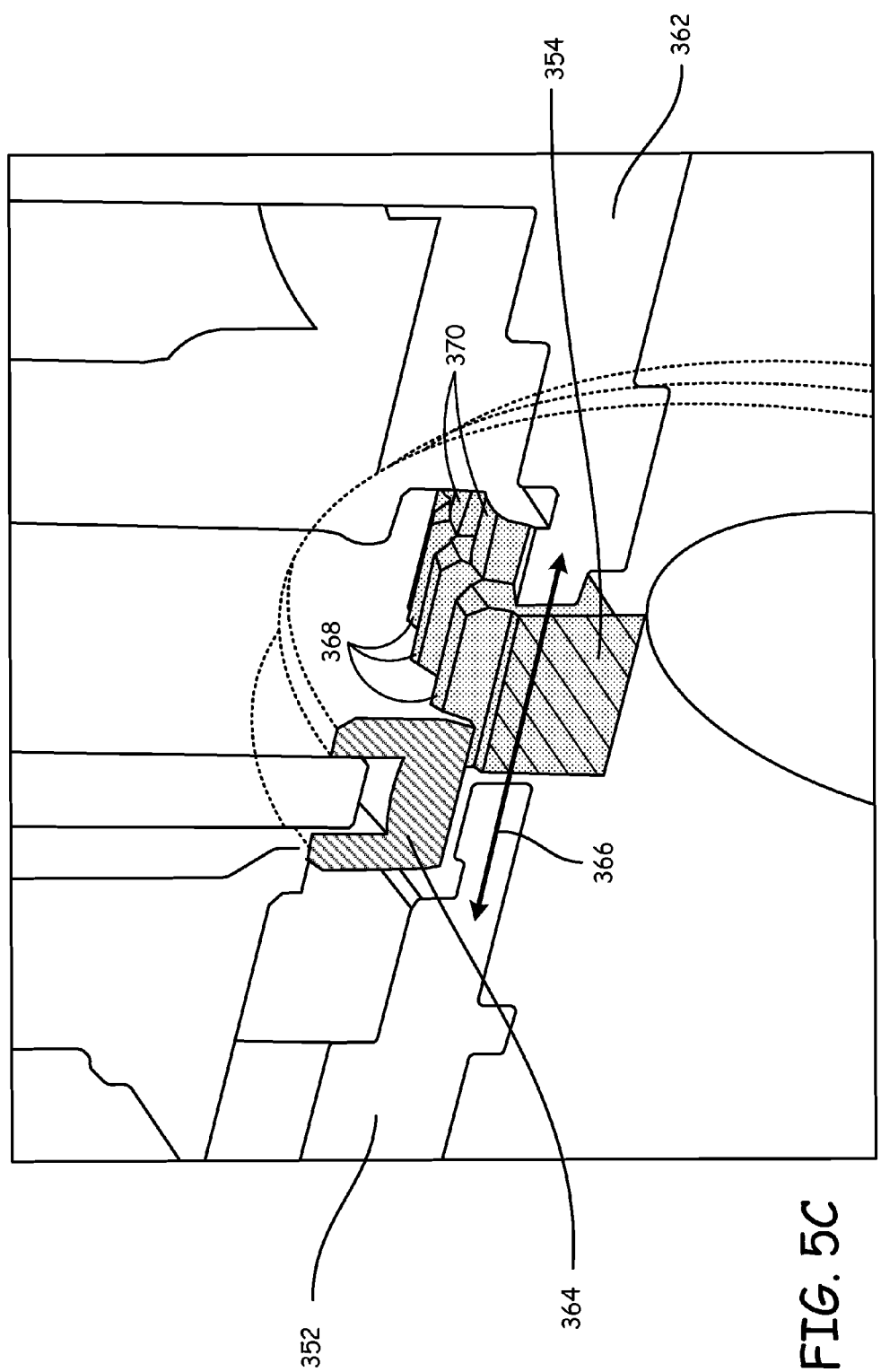

FIGS. 5A, 5B, and 5C (collectively referred to as FIG. 5) illustrate one example of transmission component 308. FIGS. 5A, 5B, and 5C are cross-sectional views taken at line 5-5 shown in FIG. 4B.

Transmission component 308 comprises a movably coupling mechanism 350, that is movable between first and second positions. In the first position (illustrated in FIG. 5A), the coupling mechanism 350 operably couples the first drive mechanism to the rotating feed mechanism, and in the second position (illustrated in FIG. 5B), the coupling mechanism 350 operably couples the second drive mechanism to the rotating feed mechanism.

As shown in FIG. 5A, in the first position the coupling mechanism 350 couples a rotatable coupler (illustratively a pulley component) 352 to a shaft connection 354. Shaft connection 354 is fixedly coupled to, and rotates with, a shaft 356 of the feed mechanism. The shaft 356 is located within a bore 358. When decoupled, the shaft 356 rotates with respect to pulley component 352 using one or more bearings 360. As shown in FIG. 5B, in the second position the coupling mechanism 350 couples a rotatable coupler (illustratively a sprocket component) 362 to shaft connection 354. When decoupled, the shaft 356 rotates with respect to sprocket component 362 using one or more bearings 360.

In the illustrated example, coupling mechanism 350 comprises a collar shift 364 that is movably laterally between the first and second positions. This is illustrated in FIG. 5C by double arrow 366. In the first position (shown in FIG. 5C), collar shift 364 engages, and operably couples together, a set of teeth 368 on shaft connection 354 and a set of teeth (not shown in FIG. 5C) on pulley component 352. In the second position (i.e., collar shift 364 is moved to the right in FIG. 5C), collar shift 364 engages, and operably couples together, the set of teeth 368 and a set of teeth 370 on component 362.

Referring again to FIGS. 5A and 5B, an actuator 372 is configured to actuate collar shift 364 between the first and second positions. The actuator 372 can be actuated by a controller (e.g., controller 262) pneumatically, hydraulically, and/or electronically. In one example, a electrical switch, solenoid, and/or other electronic components can be utilized to drive actuator 372. In one example, a cable can be utilized to actuate actuator 372. In the illustrated example, a hydraulic line is coupled to actuator 372 for hydraulically actuation.

As shown, actuator 372 includes a piston or connecting rod 374, and a transverse connecting body 376 that couples rod 374 to collar shift 364. In the illustrated example, a biasing mechanism (illustrative a spring 378 or other biasing mechanism) biases the actuator to the first position. Spring 378 is placed under compression in a compartment 380, between a cap 382 and a plunger component 384 having a sealing engagement 386 with a side wall surface 388 of the chamber or cavity in which actuator 372 is located. To actuate collar shift 364 to the second position, hydraulic fluid is pumped into the cavity at an end 390 (using a fluid port, not shown in FIG. 5), which applies a force against plunger component 384 that moves rod 374 to the right as shown in FIG. 5B.

An example operation of actuator 372 will now be described in the context of a combine feed system. A first drive mechanism of the combine (e.g., internal combustion engine) is coupled to drive shaft 356 through coupling mechanism 350. Upon detection of a plugging condition, pulley component 352 is stopped, for example by stopping the engine or decoupling a pulley system from the engine using a clutch. Then, actuator 372 is actuate under the control of the operator, or otherwise (e.g., automatically by controller 262), to move collar shift 364 to the second position. Then, a second drive mechanism (e.g., an electric motor) is operated to drive the feed system (e.g., reverse or oscillate a feed accelerator and/or threshing cylinder).

Figure 6:
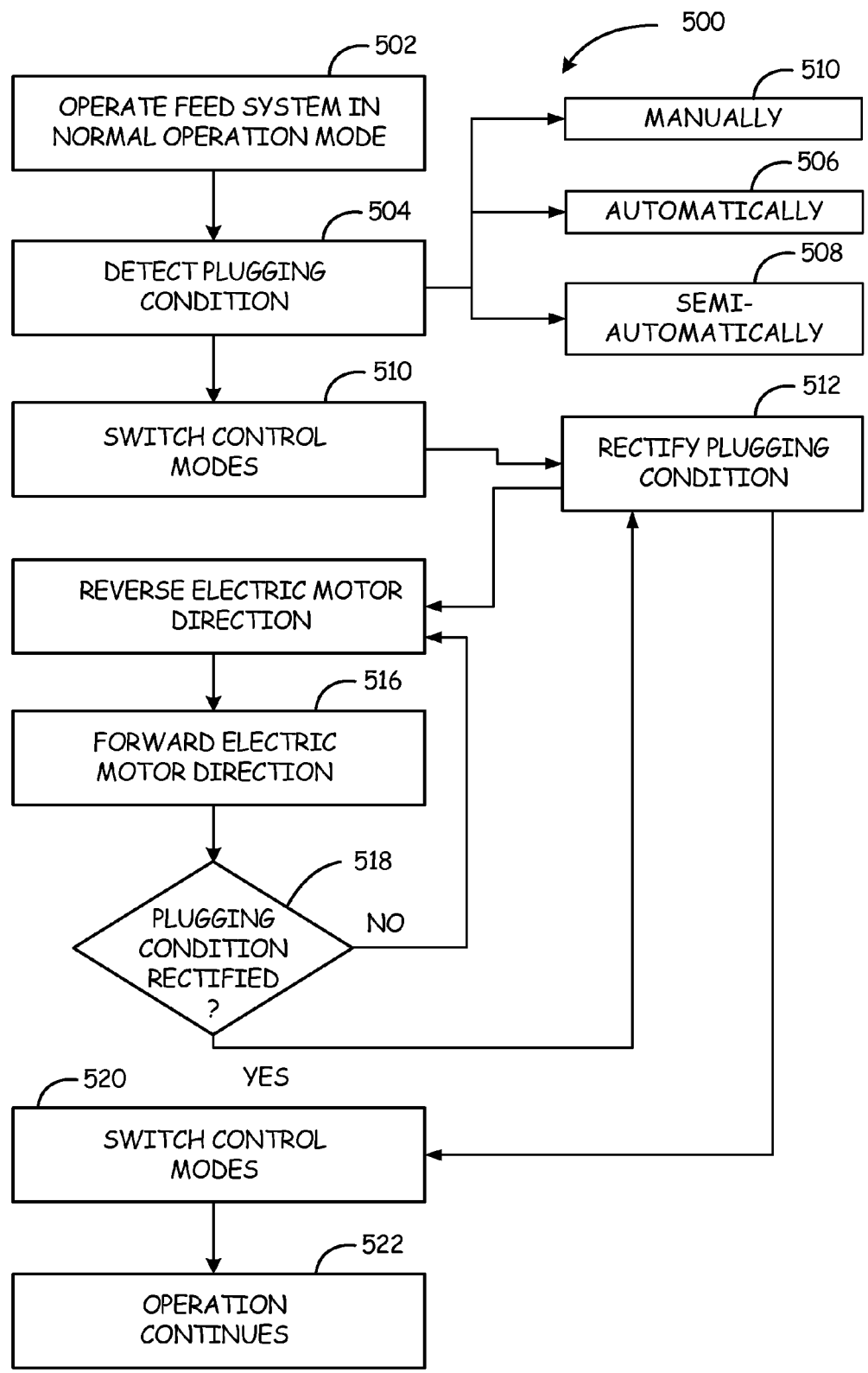
FIG. 6 illustrates an example method for operating an agricultural machine.

FIG. 6 illustrates an example method 500 for operating an agricultural machine. For sake of illustration, but not by limitation, method 500 will be described in the context of combine 200 illustrated in FIG. 3.

At block 502, feed subsystem 203 is operated in a normal mode in which a feed mechanism (e.g., feed accelerator and/or threshing cylinder) is rotated in a forward direction by first drive mechanism 264.

At block 504, a plugging condition is detected. This can be done automatically (block 506), semi-automatically (block 508), or manually (block 510). For example, an operator visually detects that the feed subsystem 203 is jammed. In another example, sensors 280 generate sensor signals indicating operation parameters of feed subsystem 203 (e.g., torque, speed, flow rate, etc.). The sensor signals are utilized by controller 262 to detect the plugging condition, upon which an indication (e.g., visually, audibly, etc.) is provided to the operator. For instance, controller 262 compares the received sensor signals to threshold values. The threshold values could be based on manufacturer settings, in one example. In another example, the threshold values are based on previously received sensor signals.

At block 510, the control mode is switched from the normal operation to rectify the plugging condition. This can be done automatically, semi-automatically, or manually. For example, the operator can actuate control switch(es) in the operator compartment and/or controller 262 can automatically perform one or more operations at block 510. In one example of block 510, the first drive mechanism 264 is disengaged (e.g., by first stopping the first drive mechanism), and coupling mechanism 278 is actuated to engage second drive mechanism 266.

At block 512, the plugging condition is rectified. In one example of block 512, at block 514 drive mechanism 266 is controlled to oscillate and/or rotate the feed mechanism in a reverse direction. In one particular example, at block 514 controller 262 implements a pre-defined control sequence that controls drive mechanism 266 in a particular manner. For instance, the feed mechanism can be rotated over a defined angular range or for a defined time period. Alternatively, or in addition, the feed mechanism can be oscillated back and forth a defined number of times. At block 516, drive mechanism 266 is controlled to drive the feed mechanism in the forward direction and, using sensors 256, controller 262 determines whether the plugging condition is rectified. If not, the method returns to block 514. This can occur automatically by controller 262, or in response to an operator input to continue the rectification process of block 512.

If the plugging condition is rectified, at block 520 the control mode is switched back to the normal operating mode by decoupling second drive mechanism 266 and re-coupling first drive mechanism 264. The normal operating mode is continued at block 522.

The present discussion has mentioned processors. In one example, a processor includes a computer processor with associated memory and timing circuitry, not separately shown. It is a functional part of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

Data store(s) have also been discussed. It will be noted they can each be broken into multiple data stores. All can be local to the systems accessing them, all can be remote, or some can be local while others are remote. All of these configurations are contemplated herein. A data store can include all types of tangible volatile and non-volatile computer-readable memory devices. It can also include computer storage media. Memory, for example, can store computer readable instructions that, when executed by a processor, cause the processor to perform any of the above-described or functions.

Also, the figures show a number of blocks with functionality ascribed to each block. It will be noted that fewer blocks can be used so the functionality is performed by fewer components. Also, more blocks can be used with the functionality distributed among more components.

Figure 7:
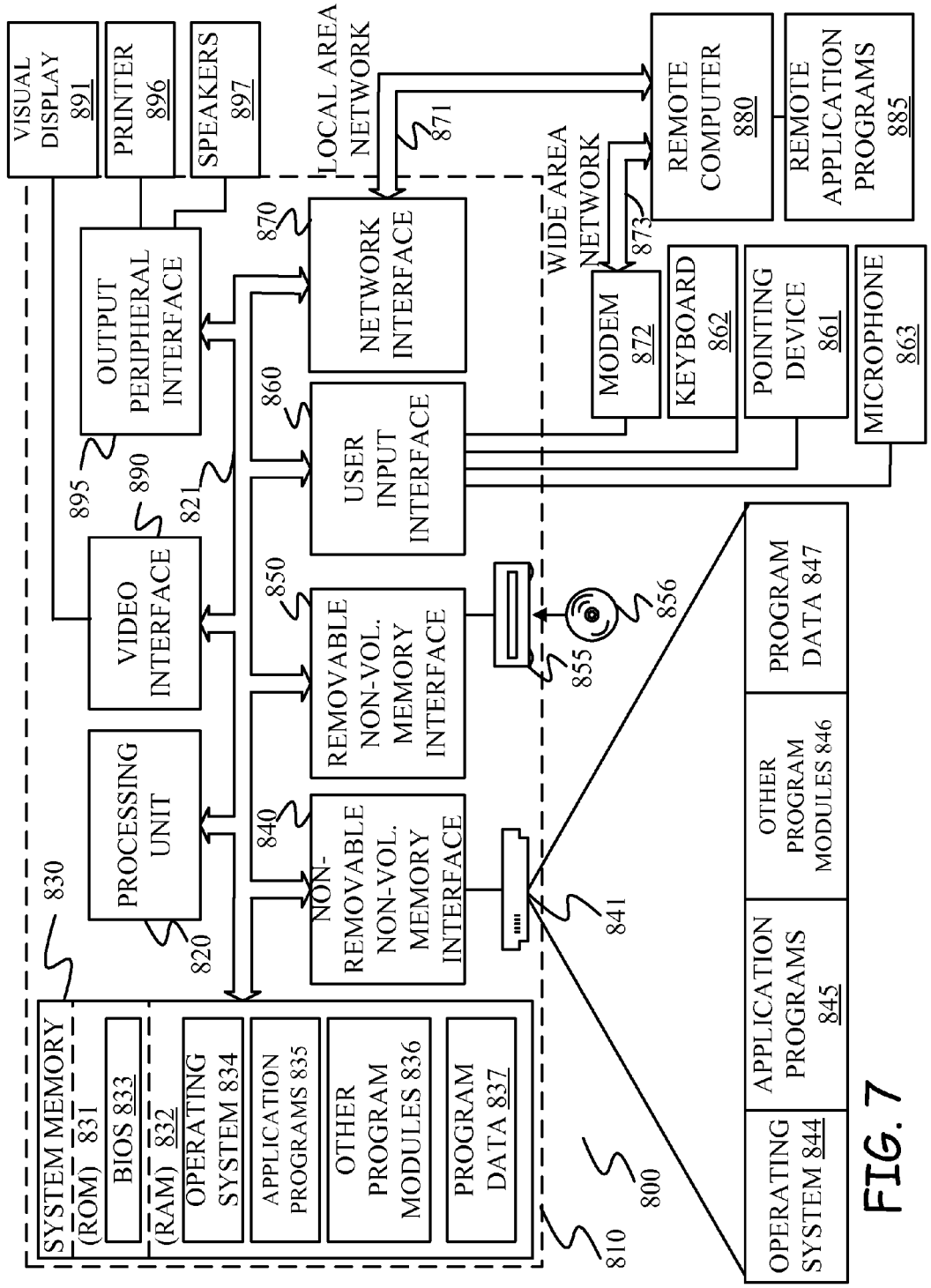
FIG. 7 is schematic diagram of one example of a computing environment.

FIG. 7 is one example of a computing environment in which elements of FIG. 3, or parts of it, (for example) can be deployed. With reference to FIG. 7, an example system for implementing some embodiments includes a general-purpose computing device in the form of a computer 810. Components of computer 810 may include, but are not limited to, a processing unit 820 (which can comprise processors from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 3 can be deployed in corresponding portions of FIG. 7.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 7 illustrates operating system 834, application programs 835, other program modules 836, and program data 837.

The computer 810 may also include other removable/non-removable volatile/nonvolatile computer storage media. By way of example only, FIG. 7 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 7, provide storage of computer readable instructions, data structures, program modules and other data for the computer 810. In FIG. 7, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, levers, buttons, steering wheels, foot pedals, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 7 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is an agricultural harvesting machine comprising a header, a feed system configured to feed material from the header into a threshing section along a conveyance path, the feed system including a rotating feed mechanism, and a drive system configured to rotationally drive the feed mechanism during a first state to convey the material along the conveyance path, and to reverse rotation of the feed mechanism during a second state.

Example 2 is the agricultural harvesting machine of any or all previous examples, wherein the header is configured to perform a crop reaping operation and the conveyance mechanism comprises a feederhouse located between the header and the rotating feed mechanism.

Example 3 is the agricultural harvesting machine of any or all previous examples, wherein the rotating feed mechanism comprises a feed accelerator configured to accelerate the material into the threshing section.

Example 4 is the agricultural harvesting machine of any or all previous examples, wherein the rotating feed mechanism comprises a threshing cylinder.

Example 5 is the agricultural harvesting machine of any or all previous examples, wherein the feed mechanism is rotated in first, forward direction during the first state and in a second, reverse direction during the second state, the second state comprises a plugging condition of the feed mechanism.

Example 6 is the agricultural harvesting machine of any or all previous examples, wherein the drive system comprises first and second drive mechanisms, and further comprising a transmission component configured to selectively transmit power from one of the first or second drive mechanisms to the rotating feed mechanism.

Example 7 is the agricultural harvesting machine of any or all previous examples, wherein the first drive mechanism comprises an internal combustion engine and the second drive mechanism comprises an electric motor.

Example 8 is the agricultural harvesting machine of any or all previous examples, wherein the transmission component comprises a movable coupling mechanism that is movable between first and second positions, the first position operably coupling the first drive mechanism to the feed mechanism and the second position operably coupling the second drive mechanism to the feed mechanism.

Example 9 is the agricultural harvesting machine of any or all previous examples, wherein the coupling mechanism comprises a collar shift having a set of teeth configured to engage corresponding sets of teeth associated with the first drive mechanism, the second drive mechanism, and the feed mechanism.

Example 10 is the agricultural harvesting machine of any or all previous examples, wherein the collar shift is actuated between the first and second positions using at least one of a hydraulic actuation component and a pneumatic actuation component.

Example 11 is the agricultural harvesting machine of any or all previous examples, and further comprising a controller configured to control the transmission component.

Example 12 is the agricultural harvesting machine of any or all previous examples, wherein the controller is configured to detect the second state based on one or more sensor signals from the feed system, and to provide feedback to an operator indicative of the second state.

Example 13 is the agricultural harvesting machine of any or all previous examples, wherein the controller is configured to control the second drive mechanism to oscillate the feed mechanism.

Example 14 is a mobile machine comprising a first subsystem comprising propulsion components configured to propel the mobile machine, a second subsystem, a first drive mechanism, a second drive mechanism, a coupling mechanism, and a controller configured to actuate the coupling mechanism to selectively couple one of the first or second drive mechanisms to drive one or more components of the second subsystem with variable speed and direction.

Example 15 is the mobile machine of any or all previous examples, wherein the one or more components comprise a rotating component having a shaft, and wherein the coupling mechanism is movable between a first position in which the first drive mechanism is operably coupled to the shaft and a second position in which the second drive mechanism is operably coupled to the shaft.

Example 16 is the mobile machine of any or all previous examples, wherein the controller comprises an actuation component configured to actuate the coupling mechanism between the first and second positions, the actuation component actuating the coupling mechanism at least one of hydraulically, pneumatically, or electronically.

Example 17 is the mobile machine of any or all previous examples, wherein the coupling mechanism comprises a collar shift having a set of teeth configured to engage corresponding sets of teeth associated with the first drive mechanism, the second drive mechanism, and the feed mechanism.

Example 18 is the mobile machine of any or all previous examples, wherein the first drive mechanism comprises a first rotatable coupler rotatably driven by a first motor, and the second drive mechanism comprises a second rotatable coupler rotatably driven by a second motor.

Example 19 is a method of operating an agricultural harvesting machine, comprising operating a feed system of the agricultural harvesting machine, wherein operating comprises rotating a feed mechanism in a forward direction to convey material along a conveyance path through a threshing section, the feed mechanism comprising at least one of a feed accelerator or a threshing cylinder, detecting a plugging condition of the feed mechanism, and controlling the feed system to rotate the feed mechanism in a reverse direction to rectify the plugging condition.

Example 20 is the method of any or all previous examples, wherein controlling the feed system comprising decoupling a first drive mechanism from the feed mechanism, coupling a second drive mechanism to the feed mechanism, and controlling operation of the second drive mechanism.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An agricultural harvesting machine comprising:
    a header configured to gather crop material;
    a feed system configured to feed the crop material from the header through a threshing section along a conveyance path, the feed system including:
        a conveyance mechanism configured to convey the crop material along the conveyance path from the header to a feed accelerator configured to accelerate the crop material into the threshing section; and
    a drive system configured to rotationally drive the feed accelerator during a first state to convey the crop material into the threshing section, and to reverse rotation of the feed accelerator during a second state, the drive system comprising:
        first and second drive mechanisms that are operable independent of one another; and
        a transmission component configured to:
            operably couple the first drive mechanism to the feed accelerator during the first state; and
            operably couple the second drive mechanism to the feed accelerator during the second state;
        wherein the feed accelerator is rotated in a first, forward direction during the first state and in a second, reverse direction during the second state.

2. The agricultural harvesting machine of claim 1, wherein the header is configured to perform a crop reaping operation, and the feed system comprises a feederhouse that includes the conveyance mechanism and is located between the header and the feed accelerator.

3. The agricultural harvesting machine of claim 1, wherein
    the first drive mechanism is associated with a first motor and the second drive mechanism is associated with a second motor,
    the feed system is configured to feed the crop material from the header through the threshing section along the conveyance path in a first direction, and the feed accelerator is configured to rotate about an axis that is orientated in a second direction that is substantially perpendicular to the first direction.

4. The agricultural harvesting machine of claim 3, wherein the first motor comprises an internal combustion engine and the second motor comprises an electric motor.

5. The agricultural harvesting machine of claim 3, wherein the transmission component comprises a movable coupling mechanism that is movable between first and second positions, the first position operably coupling the first drive mechanism to the feed accelerator and the second position operably coupling the second drive mechanism to the feed accelerator.

6. The agricultural harvesting machine of claim 5, wherein the coupling mechanism comprises a collar shift having a set of teeth configured to engage corresponding sets of teeth associated with the first drive mechanism, the second drive mechanism, and the feed accelerator.

7. The agricultural harvesting machine of claim 6, wherein the collar shift is actuated between the first and second positions using at least one of a hydraulic actuation component and a pneumatic actuation component.

8. The agricultural harvesting machine of claim 3, and further comprising a controller configured to control the transmission component.

9. The agricultural harvesting machine of claim 8, wherein the controller is configured to detect the second state based on one or more sensor signals from the feed system.

10. The agricultural harvesting machine of claim 8, wherein the controller is configured to control the second drive mechanism to automatically oscillate the feed accelerator.

11. The agricultural harvesting machine of claim 9, wherein the controller is configured to automatically shift a movable coupling mechanism of the transmission component.

12. The agricultural harvesting machine of claim 9, wherein the controller is configured to automatically implement a pre-defined control sequence to rotationally drive the feed accelerator.

13. The agricultural harvesting machine of claim 12, wherein the controller is configured to automatically implement the pre-defined control sequence by at least one of:
   rotationally driving the feed accelerator over a defined angular range; or
   rotationally driving the feed accelerator for a defined time period.

14. The agricultural harvesting machine of claim 1, wherein the second state corresponds to an indication of a plugged condition of the feed accelerator.

15. An agricultural harvesting machine comprising:
   a header configured to gather crop material;
   a feed system configured to feed the crop material from the header through a threshing section along a conveyance path, the feed system including:
      a conveyance mechanism configured to convey the crop material from the header to a rotatable feed mechanism;
   a first drive mechanism associated with a first motor;
   a second drive mechanism associated with a second motor and configured to operate independently of the first drive mechanism; and
   a transmission system comprising a coupling mechanism that is selectively movable between first and second positions, wherein,
      when in the first position, the coupling mechanism operably couples the feed mechanism to the first drive mechanism to rotate the feed mechanism in a first direction; and
      when in the second position, the coupling mechanism operably couples the feed mechanism to the second drive mechanism to rotate the feed mechanism in a second direction that is opposite the first direction.

16. The agricultural harvesting machine of claim 15, wherein the coupling mechanism comprises a collar shift having a set of teeth configured to engage corresponding sets of teeth associated with the first drive mechanism, the second drive mechanism, and the feed mechanism.

17. The agricultural harvesting machine of claim 15, wherein the feed system is configured to feed the crop material from the header through the threshing section along the conveyance path in a first direction, and wherein the rotatable feed mechanism is configured to rotate about an axis that is orientated in a second direction that is substantially perpendicular to the first direction.

18. The agricultural harvesting machine of claim 16, wherein the rotatable feed mechanism comprises a feed accelerator configured to accelerate the crop material into the threshing section.

19. The agricultural harvesting machine of claim 15, and further comprising a controller configured to control the transmission component based on a received sensor signal indicative of at least one of:
   a rotational speed of the feed system; or
   a torque applied to the feed system.

* * * * *